US012641553B2

(12) United States Patent
Zhang et al.

(10) Patent No.: US 12,641,553 B2
(45) Date of Patent: May 26, 2026

(54) METHOD OF TRANSMITTING/RECEIVING A SIGNAL SET AND APPARATUS THEREOF

(71) Applicant: SAMSUNG ELECTRONICS CO., LTD., Suwon-si (KR)

(72) Inventors: Qi Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 18/051,542

(22) Filed: Nov. 1, 2022

(65) Prior Publication Data

US 2023/0140232 A1     May 4, 2023

(30) Foreign Application Priority Data

Nov. 3, 2021     (CN) .......................... 202111295500.9
Jan. 27, 2022     (CN) .......................... 202210101671.1

(51) Int. Cl.
H04W 56/00          (2009.01)
H04J 11/00          (2006.01)
(Continued)

(52) U.S. Cl.
CPC ......... H04W 56/001 (2013.01); H04W 24/08 (2013.01); H04W 24/10 (2013.01)

(58) Field of Classification Search
None
See application file for complete search history.

(56) References Cited

U.S. PATENT DOCUMENTS

2015/0327249 A1* 11/2015 Kitazoe ................. H04W 52/50
                                                              370/329
2019/0150121 A1* 5/2019 Abdoli .................. H04L 5/0092
                                                              370/329
(Continued)

FOREIGN PATENT DOCUMENTS

WO          2021/179327 A1     9/2021

OTHER PUBLICATIONS

International Search Report and Written Opinion of the International Searching Authority dated Feb. 8, 2023, in connection with International Application No. PCT/KR2022/016896, 9 pages.
(Continued)

*Primary Examiner* — Jeffrey M Rutkowski
*Assistant Examiner* — Nong Li

(57)          ABSTRACT

The disclosure relates to a 5G or 6G communication system for supporting a higher data transmission rate. A method of a user equipment (UE) is provided, which the method comprises receiving, from a base station (BS), configuration information associated with at least one non-cell defining-synchronization signal block (NCD-SSB). The method comprises identifying configurations for the at least one NCD-SSB based on the received configuration information, wherein the configurations for the at least one NCD-SSB includes configuration of a frequency domain, configuration of a period and configuration of a time domain for the at least one NCD-SSB. The method comprises receiving the at least one NCD-SSB on a resource based on the identified configurations.

20 Claims, 14 Drawing Sheets

(51) Int. Cl.

| | |
|---|---|
| *H04W 24/08* | (2009.01) |
| *H04W 24/10* | (2009.01) |
| *H04W 72/231* | (2023.01) |

(56) References Cited

U.S. PATENT DOCUMENTS

| | | | | |
|---|---|---|---|---|
| 2020/0053811 | A1 | 2/2020 | Ang et al. | |
| 2022/0030534 | A1* | 1/2022 | Soldati | H04W 56/0015 |
| 2023/0007656 | A1 | 1/2023 | Guo et al. | |
| 2023/0074775 | A1* | 3/2023 | Lei | H04W 72/044 |
| 2023/0110787 | A1* | 4/2023 | Li | H04W 48/16 |
| | | | | 370/503 |
| 2023/0130297 | A1* | 4/2023 | Sharma | H04W 48/16 |
| | | | | 370/252 |
| 2023/0171722 | A1* | 6/2023 | Zhang | H04L 5/0053 |
| | | | | 370/503 |
| 2023/0180110 | A1* | 6/2023 | Kim | H04W 48/02 |
| | | | | 370/329 |
| 2023/0318687 | A1* | 10/2023 | Kim | H04B 7/06968 |
| | | | | 370/329 |
| 2024/0196413 | A1* | 6/2024 | Chatterjee | H04W 74/0833 |

OTHER PUBLICATIONS

Vivo et al., "Discussion on NCD SSB and UE type for RedCap UEs", R2-2109741, 3GPP TSG-RAN WG2 Meeting #116-e, Electronic, 10 pages.

Qualcomm Incorporated, "NCD-SSB and RedCap-specific BWPs", R2-2109451, 3GPP TSGRAN WG2 Meeting #116-e, Online, 6 pages.

Moderator (Ericsson), "FL summary #2 on reduced maximum UE bandwidth for RedCap", R1-2110378, 3GPP TSG-RAN WG1 Meeting #106bis-e, e-Meeting, 43 pages.

\* cited by examiner

FIG. 7B

METHOD OF TRANSMITTING/RECEIVING A SIGNAL SET AND APPARATUS THEREOF

CROSS-REFERENCE TO RELATED APPLICATIONS

This application is based on and claims priority under 35 U.S.C. § 119(a) to Chinese Patent Application Nos. 202111295500.9 and 202210101671.1, filed in the Chinese Patent Office on Nov. 3, 2021, and Jan. 27, 2022, respectively, the contents of which are incorporated herein by reference.

BACKGROUND

1. Field

The present application relates to a method of transmitting/receiving a signal set and an apparatus thereof.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present application provides a method and an apparatus for configuring non-cell defining-synchronization signal block (NCD-SSB).

According to an aspect of the present disclosure, a method of a user equipment (UE) is provided, which the method comprises receiving, from a base station (BS), configuration information associated with at least one non-cell defining-synchronization signal block (NCD-SSB). The method comprises identifying configurations for the at least one NCD-SSB based on the received configuration information, wherein the configurations for the at least one NCD-SSB includes configuration of a frequency domain, configuration of a period and configuration of a time domain for the at least one NCD-SSB. The method comprises receiving the at least one NCD-SSB on a resource based on the identified configurations.

According to an aspect of the present disclosure, a method of a base station (BS) is provided, which the method comprises transmitting, to a user equipment (UE), configuration information associated with at least one non-cell defining-synchronization signal block (NCD-SSB). The method comprises transmitting, to the UE, the at least one NCD-SSB based on information indicating configurations included in the configuration information, wherein the information indicating configurations for the at least one NCD-SSB include information indicating configuration of a frequency domain, information indicating configuration of a period and information indicating configuration of a time domain and for the at least one NCD-SSB.

According to an aspect of the present disclosure, A user equipment (UE) is provided, which the UE comprises a transceiver, memory and at least one processor operably connected to the transceiver and the memory. The at least one processor is configured to receive, from a base station (BS), configuration information associated with at least one non-cell defining-synchronization signal block (NCD-SSB). The at least one processor is configured to identify configurations for the at least one NCD-SSB based on the received configuration information, wherein the configurations for the at least one NCD-SSB includes configuration of a frequency domain, configuration of a period and configuration of a time domain for the at least one NCD-SSB. The at least one processor is configured to receive the at least one NCD-SSB on a resource based on the identified configurations.

According to an aspect of the present disclosure, A base station (BS) is provided, which the BS comprises a transceiver, memory and at least one processor operably connected to the transceiver and the memory. The at least one processor is configured to transmit, to a user equipment (UE), configuration information associated with at least one non-cell defining-synchronization signal block (NCD-SSB). The at least one processor is configured to transmit, to the UE, the at least one NCD-SSB on a resource based on information indicating configurations included in the configuration information, wherein the information indicating configurations for the at least one NCD-SSB include information indicating configuration of a frequency domain, information indicating configuration of a period and information indicating configuration of a time domain for the at least one NCD-SSB.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts:

Figure 7B:
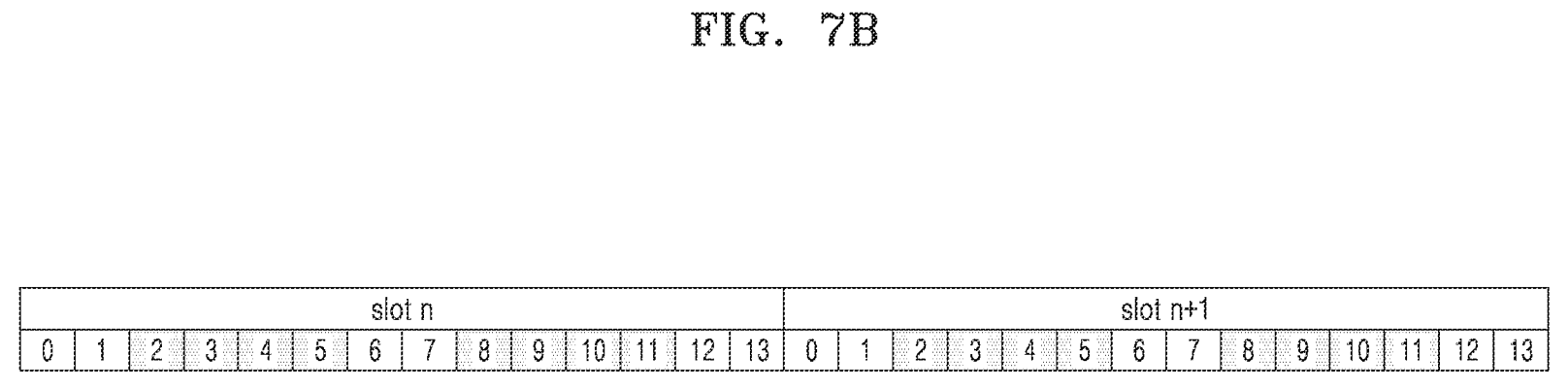

FIGS. 7A and 7B illustrate symbol positions of signal sets according to an embodiment of the present disclosure;

DETAILED DESCRIPTION

Figure 1:
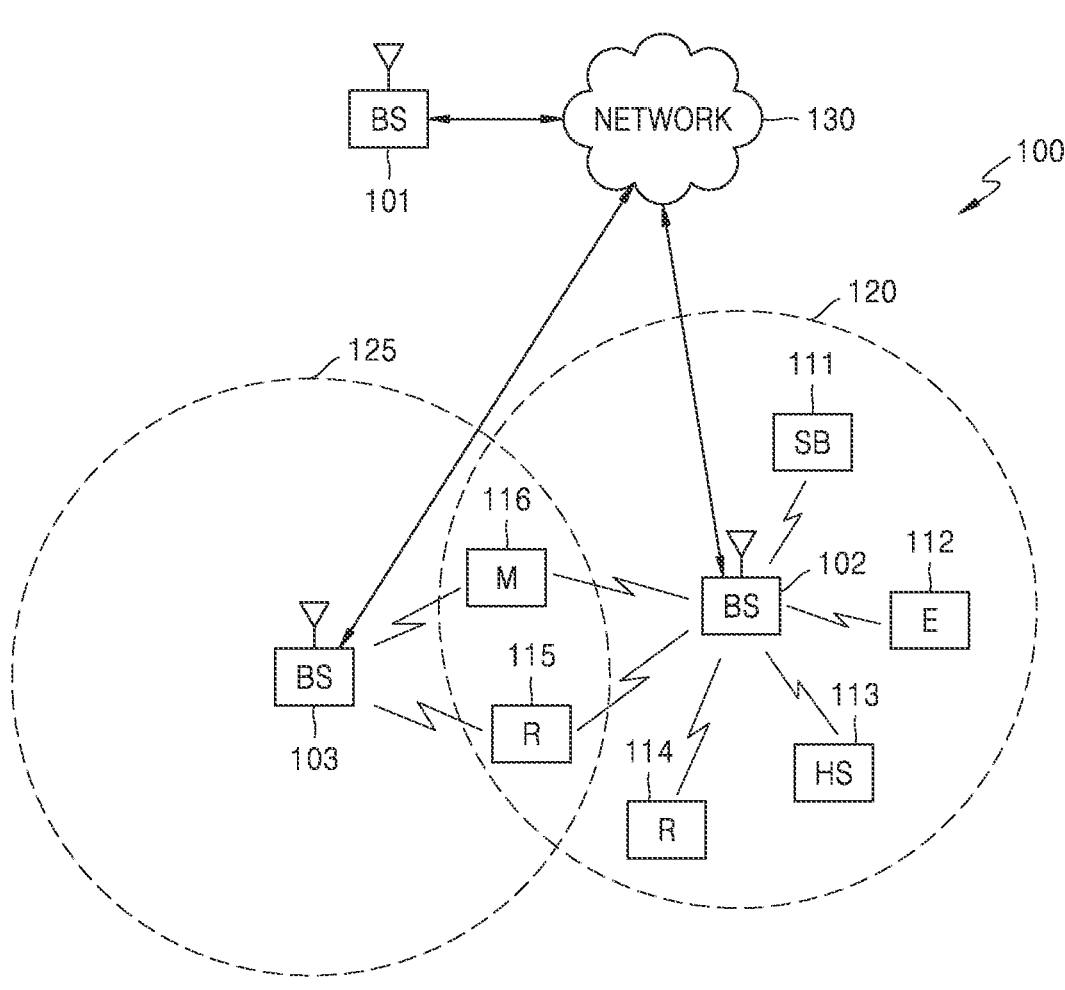
FIG. 1 illustrates an overall structure of a wireless network according to an embodiment of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

The technical solutions of embodiments of this present application can be applied to various communication systems, such as global system for mobile communications (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, universal mobile telecommunications system (UMTS), worldwide interoperability for microwave access (WiMAX) communication system, 5th generation (5G) system or NR, etc. In addition, the technical solutions of embodiments of this present application can be applied to future-oriented communication technologies.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

A gNB 102 provides wireless broadband access to the network 130 for a first plurality of user equipments (UEs) within a coverage area 120 of the gNB 102. The first plurality of UEs include a UE 111, which may be located in a small business; a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. A GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, LTE, LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, a gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102, and/or 103 can provide access to other or additional external networks, such as external telephone networks or other types of data networks.

Figure 2A:
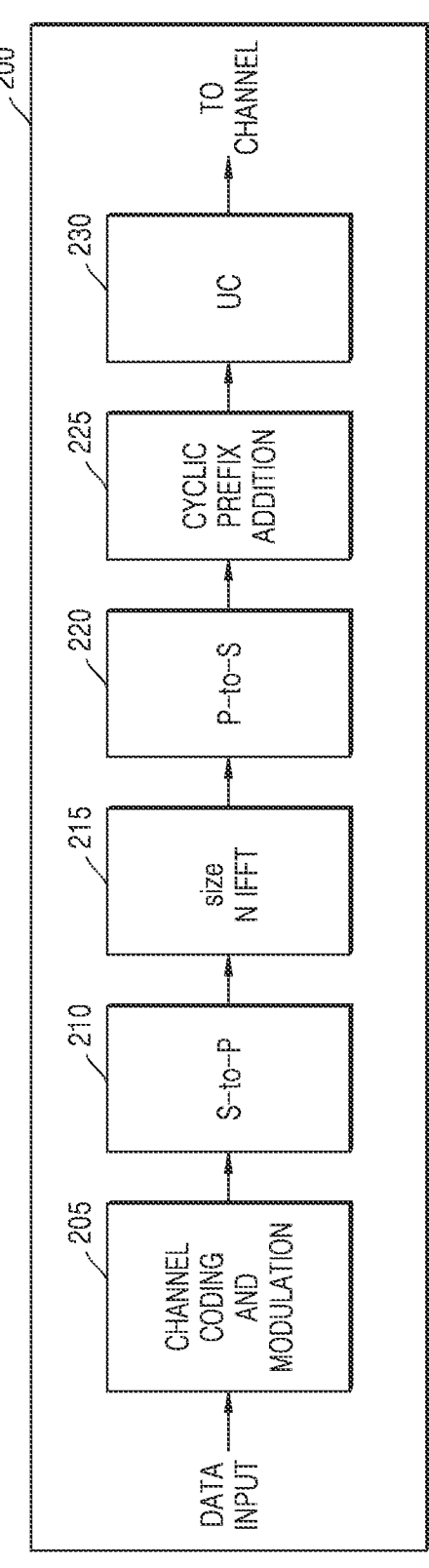
FIGS. 2A and 2B illustrate a transmission path and a reception path according to an embodiment of the present disclosure.
Figure 2B:
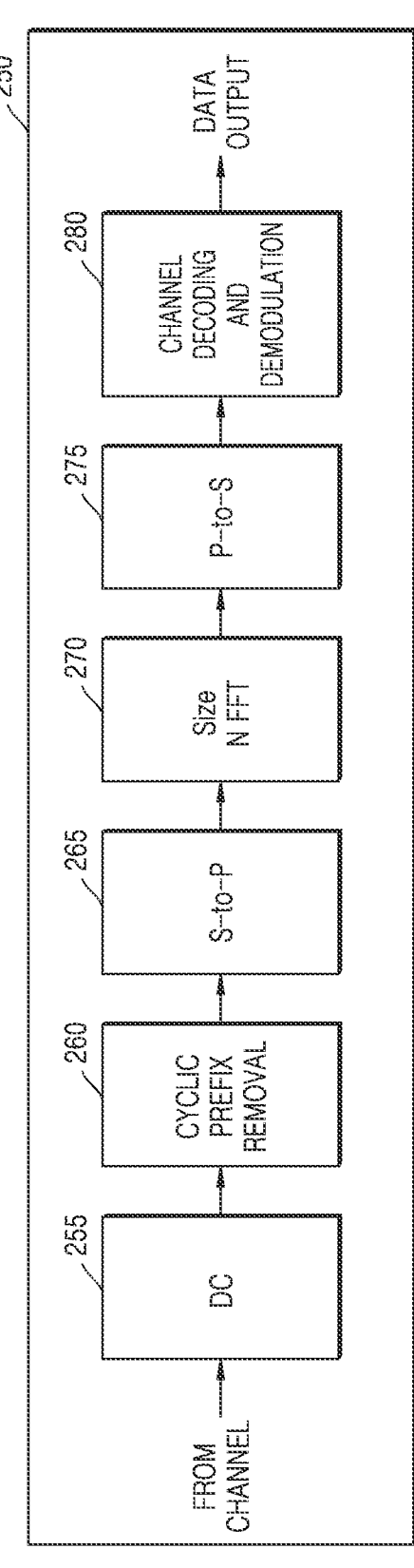

FIGS. 2A and 2B illustrate example wireless transmission and reception paths according to the present disclosure. In the following description, the transmission path 200 can be described as being implemented in a gNB, such as a gNB 102, and the reception path 250 can be described as being implemented in a UE, such as a UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency domain modulated symbols. The serial-to-parallel (S-to-P) block 210 converts (such as demultiplexes) serial modulated symbols into parallel data to generate N parallel symbol streams, where N is a size of the IFFT/FFT used in a gNB 102 and a UE 116. The size N IFFT block 215 performs IFFT operations on the N parallel symbol streams to generate a time domain output signal. The parallel-to-serial block 220 converts (such as multiplexes) parallel time domain output symbols from the size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from a gNB 102 arrives at a UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time domain baseband signal. The serial-to-parallel block 265 converts the time domain baseband signal into a parallel time domain signal. The size N FFT block 270 performs an FFT algorithm to generate N parallel frequency domain signals. The parallel-to-serial block 275 converts the parallel frequency domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from the UEs 111-116 in the uplink. Similarly, each of UEs 111-116 may implement a transmission path 200 for transmitting to the gNBs 101-103 in the uplink, and may implement a reception path 250 for receiving from the gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
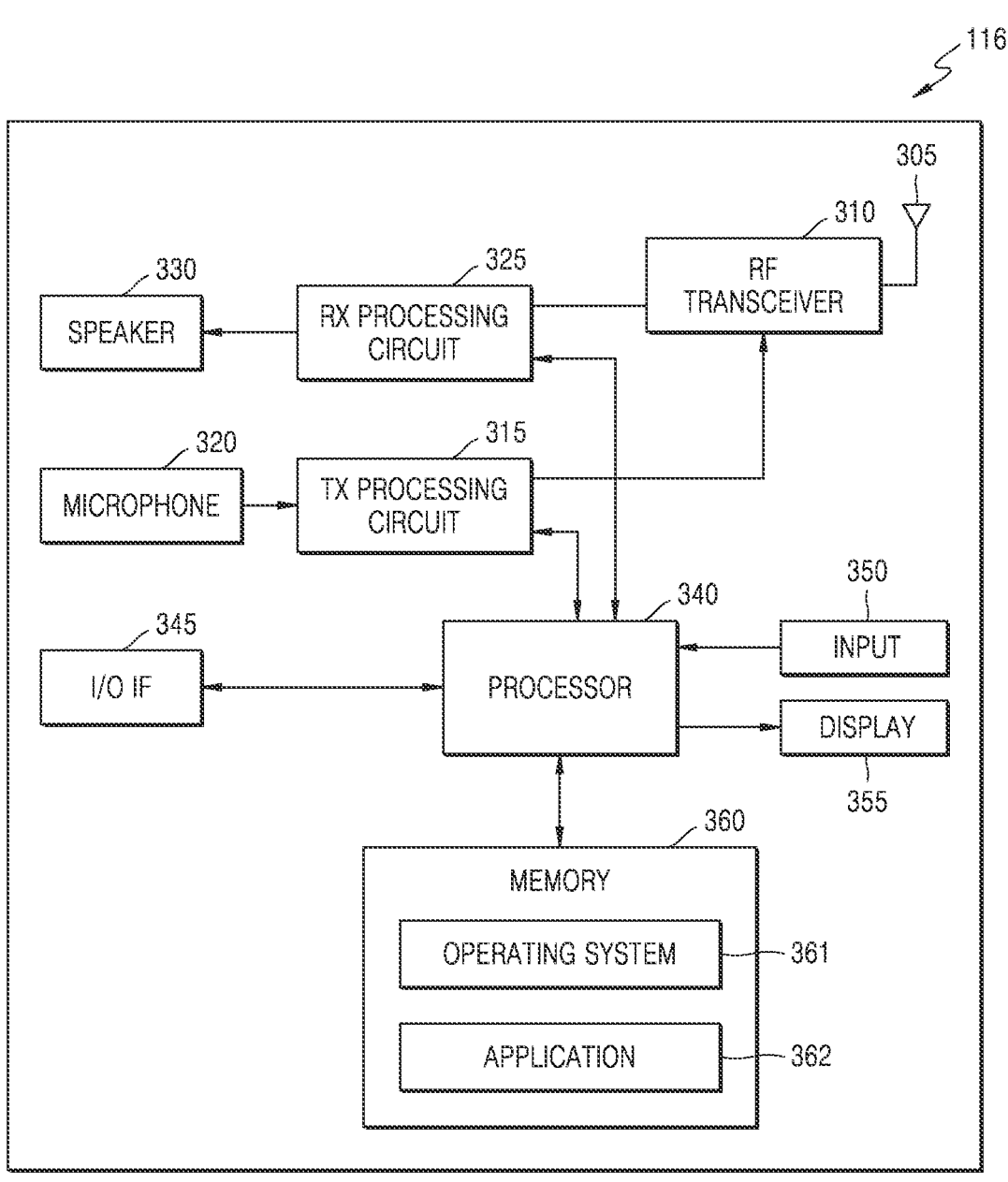
FIGS. 3A and 3B illustrate structural diagrams of a UE and a base station, respectively, according to an embodiment of the present disclosure.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

A UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
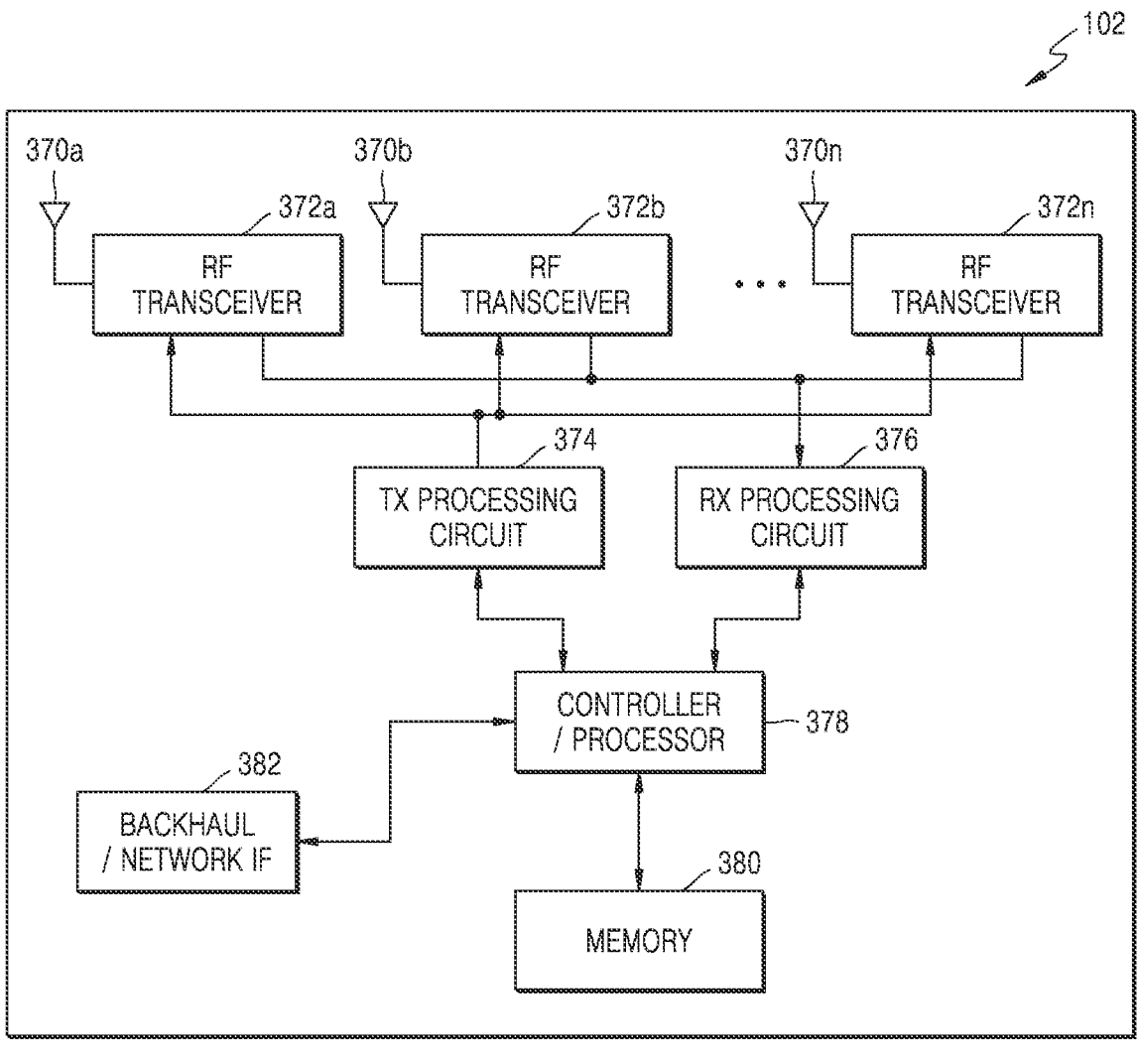

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, a gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. A gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows a gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. Apart of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

Figure 4:
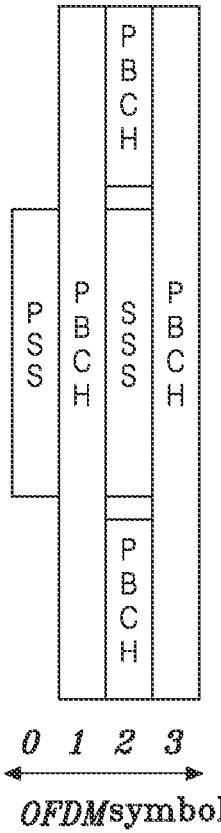
FIG. 4 illustrates a synchronization signal/PBCH block including a PSS, an SSS, and a PBCH according to an embodiment of the present disclosure.

The NR system designs primary synchronization signal (PSS) and secondary synchronization signal (SSS) for downlink synchronization, and transmits master information blocks (MIB) in physical broadcast channel (PBCH). The PSS and SSS occupy 1 symbol in time domain and 127 subcarriers in frequency domain, respectively, and the PBCH occupies 3 symbols in time domain and 240 subcarriers in frequency domain, respectively, as shown in FIG. 4. The synchronization signals PSS and SSS together with PBCH constitute an SSB.

SSBs can be categorized into two types: cell-defining SSB (CD-SSB), which contains remaining minimum system information (RMSI); and non-cell defining SSB (NCD-SSB). A cell-defining SSB (CD-SSB) may be used for:

Cell initial access;

Radio link monitoring (RLM);

Beam failure recovery (BFR);

Resources for transmission configuration indicator (TCI); and/or

Radio resource management (RRM) measurement: serving cell measurement, neighboring cell inter-frequency measurement and neighboring cell Intra-frequency measurement.

However, a non-cell defining SSB cannot be used for initial access, RLM or BFR, but can only be used for some of scenarios above, e.g., in TCI and RRM.

The GSCN supported by frequency band is used for fast downlink synchronization at positions in the frequency band. The subcarrier with an index of 120 in CD-SSB may be aligned with the synchronization raster, while the frequency domain position of NCD-SSB may be in the channel raster. When the NCD-SSB's frequency domain position coincides with the GSCN, the bit information in PBCH of the NCD-SSB carries a CD-SSB search indication.

The 5G is systematically optimized and designed for enhanced mobile broadband (eMBB), enhanced ultra-reliable low latency communications (eURLLC), enhanced machine type communication (EMTC), etc. In order to provide a better support for machine communication, a type of reduced capability UE (abbreviated as redcap UE) is defined currently. Compared with other UEs, this type of UE has lower support capability, such as fewer supportable antennas, smaller supportable bandwidth, etc., and thus has lower energy consumption and longer battery usage life. Currently, a new initial uplink/downlink bandwidth part (abbreviated as Initial UL/DL BWP) is designed for redcap UE. In order to reduce the impact on system performance, the frequency domain position of this new initial bandwidth part may be set at the edge of the carrier frequency band with high priority. However, the frequency domain position of the CD-SSB may be at the GSCN. On the other hand, the choice of GSCN depends on located frequency band and network settings (the GSCNs available in the frequency band are shown in TABLE 1).

TABLE 1

| Frequency band for GSCN | | | |
| --- | --- | --- | --- |
| NR operating band | SS Block SCS | SS Block pattern | Range of GSCN (First-<Step size>-Last) |
| n1 | 15 kHz | Case A | 5279-<1>-5419 |
| n2 | 15 kHz | Case A | 4829-<1>-4969 |
| n3 | 15 kHz | Case A | 4517-<1>-4693 |
| n5 | 15 kHz | Case A | 2177-<1>-2230 |
| | 30 kHz | Case B | 2183-<1>-2224 |
| n7 | 15 kHz | Case A | 6554-<1>-6718 |
| n8 | 15 kHz | Case A | 2318-<1>-2395 |
| n12 | 15 kHz | Case A | 1828-<1>-1858 |
| n14 | 15 kHz | Case A | 1901-<1>-1915 |
| n18 | 15 kHz | Case A | 2156-<1>-2182 |
| n20 | 15 kHz | Case A | 1982-<1>-2047 |
| n25 | 15 kHz | Case A | 4829-<1>-4981 |
| n26 | 15 kHz | Case A | 2153-<1>-2230 |
| n28 | 15 kHz | Case A | 1901-<1>-2002 |
| n29 | 15 kHz | Case A | 1798-<1>-1813 |
| n30 | 15 kHz | Case A | 5879-<1>-5893 |
| n34 | 15 kHz | Case A | NOTE 5 |
| | 30 kHz | Case C | 5036-<1>-5050 |
| n38 | 15 kHz | Case A | NOTE 2 |
| | 30 kHz | Case C | 6437-<1>-6538 |
| n39 | 15 kHz | Case A | NOTE 6 |
| | 30 kHz | Case C | 4712-<1>-4789 |
| n40 | 30 kHz | Case C | 5762-<1>-5989 |
| n41 | 15 kHz | Case A | 6246-<3>-6717 |
| | 30 kHz | Case C | 6252-<3>-6714 |
| n46 | 30 kHz | Case C | 8993-<1>-9530 |
| n48 | 30 kHz | Case C | 7884-<1>-7982 |

TABLE 1-continued

Frequency band for GSCN

| NR operating band | SS Block SCS | SS Block pattern | Range of GSCN (First-<Step size>-Last) |
|---|---|---|---|
| n50 | 30 kHz | Case C | 3590-<1>-3781 |
| n51 | 15 kHz | Case A | 3572-<1>-3574 |
| n53 | 15 kHz | Case A | 6215-<1>-6232 |
| n65 | 15 kHz | Case A | 5279-<1>-5494 |
| n66 | 15 kHz | Case A | 5279-<1>-5494 |
|  | 30 kHz | Case B | 5285-<1>-5488 |
| n70 | 15 kHz | Case A | 4993-<1>-5044 |
| n71 | 15 kHz | Case A | 1547-<1>-1624 |
| n74 | 15 kHz | Case A | 3692-<1>-3790 |
| n75 | 15 kHz | Case A | 3584-<1>-3787 |
| n76 | 15 kHz | Case A | 3572-<1>-3574 |
| n77 | 30 kHz | Case C | 7711-<1>-8329 |
| n78 | 30 kHz | Case C | 7711-<1>-8051 |
| n79 | 30 kHz | Case C | 8480-<16>-8880 |
| n90 | 15 kHz | Case A | 6246-<1>-6717 |
|  | 30 kHz | Case C | 6252-<1>-6714 |
| n91 | 15 kHz | Case A | 3572-<1>-3574 |
| n92 | 15 kHz | Case A | 3584-<1>-3787 |
| n93 | 15 kHz | Case A | 3572-<1>-3574 |
| n94 | 15 kHz | Case A | 3584-<1>-3787 |
| n96 | 30 kHz | Case C | 9531-<1>-10363 |

Figure 5:
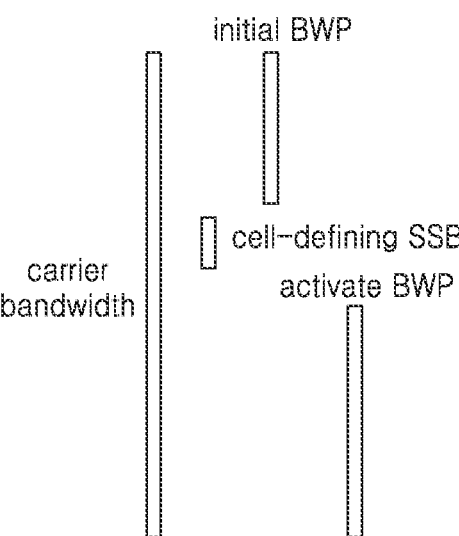
FIG. 5 illustrates a scenario where CD-SSB is not included in activate bandwidth according to an embodiment of the present disclosure.

Therefore, in the new initial bandwidth, CD-SSB may not be included, and similarly, for an active BWP in connected mode, it may not include CD-SSB, either, as shown in FIG. 5. As CD-SSB is not included in the active bandwidth, the system performance may be limited. For example, a terminal cannot perform the measurements such as RLM, BFR, etc., based on SSB. At the same time, in a case of measurements such as RRM etc. where the terminal is required to shifting the radio frequency to the CD-SSB then to perform the measurement, a redcap UE cannot perform link monitoring, beam recovery and RRM measurement with low energy consumption due to its limited capability and high energy-saving requirements. Therefore, a method to support enhanced measurement is in need.

Before transmitting a random access channel PRACH, the terminal is required to perform measurement of downlink quality to determine related parameters of the random access message PRACH. In addition, the terminal is required to perform measurements before transmitting a PRACH retransmission. Whether to perform measurement of downlink quality before the terminal transmitting the PRACH retransmission may be determined by the implementation of the terminal, or may be specified in advance by protocol. Performing continuous measurement of downlink quality can be implemented by downlink signals such as SSB, CSI-RS, TRS, etc., and the SSB may be CD-SSB or NCD-SSB.

When a bandwidth part where the terminal performs random access does not contain SSB, the terminal is required to shifting the radio frequency to a bandwidth part where the random access is located for random access after SSB measurement. The higher layer indicates the physical layer to perform PRACH transmission when at least one of the following cases occurs:

The terminal does not detect a DCI corresponding to CRC scrambled by RA-RNTI in the random access feedback window (such as DCI format 1_0);

The terminal detects the DCI, but the Least Significant Bit of the subframe index therein is different from the Least Significant Bit of the subframe index where the terminal transmits PRACH;

The terminal does not receive the PDSCH properly in the random access feedback window;

The higher layer does not identify a random access preamble identity (RAPID) corresponding to a transmission PRACH; and/or A physical layer indication of completion of SSB measurement is received.

Preferably, PRACH transmission indicated by the higher layer includes the first transmission of PRACH and/or the retransmission of PRACH.

Before the terminal transmits the PRACH, the terminal may or may not perform measurement of downlink quality. Preferably, measurement of downlink quality may be performed before the terminal transmits the initial transmission of PRACH, and the UE may autonomously choose, before the terminal transmits the retransmission of PRACH, whether to perform measurement of downlink quality. Alternatively, according to a predefined regulation, it is determined whether to perform measurement of downlink quality before transmitting the PRACH. In addition, measurement of downlink quality may be performed before or after the higher layer triggers the PRACH transmission.

When a first condition is satisfied, the terminal transmits the PRACH within time window 1 after the last symbol in the random access message feedback window (RAR window), or within time window 1 after the last symbol of the PDSCH reception, where the first condition is at least one of:

If the terminal may perform measurement of downlink quality while monitoring a PDCCH of a RAR and/or accepting a PDSCH carrying a RAR;

If the terminal may perform downlink measurement within a frequency band where the current PDCCH indicating the RAR and/or the PDSCH carrying the RAR is located (such as the current downlink BWP);

If the terminal does not need to perform downlink measurement before transmitting the PRACH;

If the terminal completes the downlink measurement before the higher layer triggers a PRACH message; and/or If the current BWP includes a reference signal for performing downlink measurement.

Since there are not necessarily resources that can be used for transmitting the PRACH within the above time window, the terminal is not necessarily required to have to transmit the PRACH within time window 1, but required to be able to get ready to transmit the PRACH within time window 1, where the time window 1 is $N_{T,1}+0.75$ milliseconds, and where $N_{T,1}$ is the minimum time standard for the terminal to perform one PDSCH decoding.

If the terminal performs measurement, and, for a downlink BWP corresponding to an uplink BWP where the PRACH occasion(RO) is located (e.g., the initial downlink BWP), there are no reference signals for measurement of downlink quality (such as CD-SSB, NCD-SSB, CSI-RS, TRS, etc.), then for a terminal with limited bandwidth, the transmission of PRACH is required to be performed after radio frequency shifting to a frequency domain position of a downlink BWP where the reference signal for measurement of downlink quality is located for measurement. Then the above time window 1 may not be sufficient to cover the time for radio frequency shifting and measuring. A time window 2 can be defined or configured, where the time window 2 is larger than time window 1. For example, time window 2=time window 1+delta milliseconds, where delta is a predefined value.

When a terminal has a specific capability and/or a second condition is satisfied, the terminal is only required to transmit the PRACH within time window 2 after the last symbol in the random access message feedback window (RAR window) or within time window 2 after the last symbol received by PDSCH, where the second condition includes at least one of:

If the terminal cannot perform measurement of downlink quality while monitoring the PDCCH of RAR and/or accepting the PDSCH carrying RAR;

If the terminal cannot perform downlink measurement in the frequency band where the current PDCCH indicating RAR and/or the PDSCH carrying RAR is located (such as the current downlink BWP);

If the terminal performs downlink measurement before transmitting the PRACH;

If the terminal performs downlink measurement after the high layer triggers the PRACH message; and/or If the current BWP does not include a reference signal for downlink measurement.

When a terminal has a specific capability and/or a second condition is satisfied, a time when the terminal transmits the PRACH is not limited, and the terminal may customize the transmission of the PRACH according to the implementation, where the second condition includes at least one of:

If the terminal cannot perform measurement of downlink quality while monitoring the PDCCH of RAR and/or accepting the PDSCH carrying RAR;

If the terminal cannot perform downlink measurement in the frequency band where the current PDCCH indicating RAR and/or the PDSCH carrying RAR is located (such as the current downlink BWP);

If the terminal performs downlink measurement before transmitting the PRACH;

If the terminal performs downlink measurement after the high layer triggers the PRACH message; and/or If the current BWP does not include a reference signal for downlink measurement.

In an embodiment, the terminal determines the delta according to the capability and/or subcarrier spacing. For example, the delta is determined according to twice the bandwidth part switching delay plus the time taken for the additional measurement in Table A below. When the terminal capability is type 1, and the parameter $\mu$ is 0 (i.e., the subcarrier spacing is 15 KHz), the delta is 1*2 milliseconds. In addition, twice the bandwidth part switching time is used only for switching, whereas another specific time is needed for measurement.

In an embodiment, the time taken for measurement is related to the measurement gap pattern, which may be a predefined gap value or a gap value determined in a predefined table. For example, the measurement gap time may be a gap value corresponding to a gap pattern 0/1 in the following table B. Since the gap pattern 0/1 is a capability of measuring gap that the terminal may support, the terminal may determine the measuring gap time by looking up table B.

In an embodiment, the time taken for measurement is determined by at least one of:

Terminal capability;

Frequency domain or time domain resources occupied by RS for measurement, such as the number of SSB transmitted by the base station and the number of CSI-RS ports;

Subcarrier spacing of the RS for measurement; and/or

Subcarrier spacing of the BWP where the terminal is located.

When SSB is included in the bandwidth part where the terminal performs random access, the terminal may trigger random access according to the existing protocol, or transmit a random access signal according to the same method as that used when SSB is not included in the bandwidth part where the terminal performs random access in the present application.

TABLE 2

| Bandwidth part switching delay | | | |
|---|---|---|---|
| NR Slot Length | | Bandwidth Part Switching Delay $T_{BWPswitchDelay}$ (time slot) | |
| $\mu$ | (ms) | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

*Note 1*:
Based on terminal capability.
Note 2:
When the bandwidth part switching involves a change in subcarrier spacing, the bandwidth part delay is determined by the smallest subcarrier spacing among the bandwidth part subcarrier spacings before and after the switching.

TABLE 3

| Gap pattern configuration | | |
|---|---|---|
| Gap Pattern Number | Measuring Gap Length (MGL, ms) | Measuring Gap Repetition Period (MGRP, ms) |
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |
| 24 | 10 | 80 |
| 25 | 20 | 160 |

When SSB is included in the bandwidth part where the terminal performs random access, the terminal may trigger random access according to the existing protocol, or transmit a random access signal according to the same method as that used when SSB is not included in the bandwidth part where the terminal performs random access in the present application.

The embodiments of the present application provide a method of transmitting/receiving a signal block/set (hereinafter referred to as a signal set) in which a terminal receives a configuration for the signal set, and the terminal receives a downlink signal according to the configuration. When CD-SSB is not contained in active bandwidth, the introduction of this signal set may achieve better system performance, for example, it may enable the terminal to perform measurements such as link monitoring, beam recovery and RRM, so as to achieve better system performance. Alternatively, the signal set received by the terminal uses the same cell index as the existing SSB does for sequence generation.

Parameter $$N_{ID}^{(1)}$$

and parameter $$N_{ID}^{(2)}$$

determine the generation of sequences of primary and secondary synchronization signals, separately. If the terminal is required to reserve those two parameter values during initial access, so that these two parameter values may be reused for subsequent procedure of synchronization and signal strength measurement, it is required to guarantee that the signal set uses the same cell index (for example, ID) as what the serving cell uses for sequence generation, that is, uses the same cell index as what SSS uses.

Alternatively, the configuration for time domain position or frequency domain position of the signal set uses the configuration for time domain position or frequency domain position of the SSB, respectively.

Like SSB, PSS and SSS in the signal set occupy 1 symbol and 127 subcarriers respectively in time domain and in frequency domain, whereas PBCH occupies 3 symbols and 240 subcarriers respectively in time domain and in frequency domain.

At this time, the terminal may determine subsequent mechanisms by demodulating the indication information carried in PBCH, namely ssb-SubcarrierOffset (SSS subcarrier offset): when the frequency point belongs to FR1 and the parameter $k_{SSB} > 23$, or when the frequency point belongs to FR2 and the parameter $k_{SSB} > 11$, the terminal does not perform reception of subsequent system information after SSB reception. Therefore, the signal set may be distinguished from the CD-SSB, that is, when the frequency domain position of the signal set is in the synchronization raster, other terminals may not perform initial access via the signal set, and this signal set is used only for measurement configured the network.

Alternatively, the signal set is different from the existing SSB in terms of time domain position and/or frequency domain position, and the signal set is a part of the structure of the existing SSB.

In SSB-based measurement, the terminal may obtain the measurement result (e.g., synchronous signal-reference signal received quality/synchronous signal reference quality received power, SS-RSRQ/SS-RSRP) according to at least the secondary synchronization signal, and the terminal may optionally combine PBCH demodulation reference signal (PBCH DMRS) to obtain the measurement result, depending on the implementation of the terminal. In order to improve spectrum utilization, the terminal may receive a subset of the existing SSB for related measurement.

Four types of structures of signal sets are given below, all of which are subsets of the existing SSB: i) only a combination of primary synchronization signal, secondary synchronization signal and PBCH DMRS in the existing SSB structure is included, or ii) only a combination of primary synchronization signal and secondary synchronization signal.

nal is included, or iii) only a combination of the secondary synchronization signal and PBCH DMRS is included, or iv) only secondary synchronization signal is included, thus saving time and frequency domain resources. When this signal set is at the synchronization raster, since the signal combination is different from the existing SSB, the terminal cannot perform signal synchronization at the predetermined position, and the terminal may not perform the initial access in this signal set.

Figure 6:
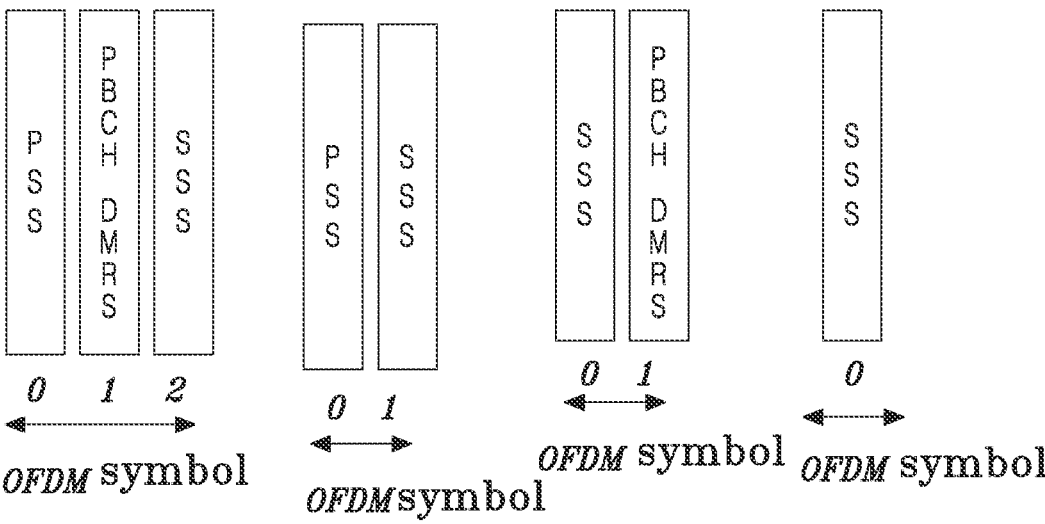
FIG. 6 illustrates four types of structures of signal sets according to an embodiment of the present disclosure.

In the structure of the first type of signal set, the relative time and frequency domain positions of the primary and secondary synchronization signals remains unchanged, so the existing synchronization method for terminal can be used for signal synchronization, such as downlink synchronization before reception of paging channel in radio resource control (RRC) idle or RRC inactive state. At the same time, the secondary synchronization signal and PBCH DMRS that it owns may support the terminal to perform measurement of signal strength. For example, the terminal may firstly measure the signal strength of the secondary synchronization signal, and then comprehensively calculate the RSRP according to the signal strength measured by the PBCH DMRS. In addition, the structure of the second type of signal set may be used mainly for a scenario of synchronization, and the structure of the third type of signal set is used mainly for measurement of signal strength. The structure of the third type of signal set contains only the secondary synchronization signal, thus has less overhead than the other two types of signal combinations, and can be used mainly for supporting terminals with a certain RSRP measurement accuracy to perform measurement of signal strength. The above signal forms are shown in FIG. 6.

The relative time and frequency domain positions of each structure of the signal set may be defined by the following tables.

TABLE 4

| | Structure 1 | |
| --- | --- | --- |
| Channel or signal | OFDM symbol index l relative to the start of an SS/PBCH block | Subcarrier index k relative to the start of an SS/PBCH block |
| PSS | 0 | 8, 9, . . . , 134 |
| SSS | 2 | 8, 9, . . . , 134 |
| Set to 0 | 0 | 0, 1, . . . 7, 135, 143 |
| | 2 | 0, 1, . . . 7, 135, 143 |
| DM-RS for PBCH | 1 | 0 + v, 4 + v, 8 + v, . . . , 140 + v, else set 0 |

TABLE 5

| | Structure 2 | |
| --- | --- | --- |
| Channel or signal | OFDM symbol index l relative to the start of an SS/PBCH block | Subcarrier index k relative to the start of an SS/PBCH block |
| PSS | 0 | 8, 9, . . . , 134 |
| SSS | 1 | 8, 9, . . . , 134 |
| Set to 0 | 0 | 0, 1, . . . 7, 135, 143 |
| | 2 | 0, 1, . . . 7, 135, 143 |

TABLE 6

| | Structure 3 | |
| --- | --- | --- |
| Channel or signal | OFDM symbol index l relative to the start of an SS/PBCH block | Subcarrier index k relative to the start of an SS/PBCH block |
| SSS | 0 | 8, 9, . . . , 134 |
| Set to 0 | 0 | 0, 1, . . . 7, 135, 143 |
| DM-RS for PBCH | 1 | 0 + v, 4 + v, 8 + v, . . . , 140 + v, else set 0 |

TABLE 7

| | Structure 4 | |
| --- | --- | --- |
| Channel or signal | OFDM symbol index l relative to the start of an SS/PBCH block | Subcarrier index k relative to the start of an SS/PBCH block |
| SSS | 0 | 8, 9, . . . , 134 |
| Set to 0 | 0 | 0, 1, . . . 7, 135, 143, else set 0 |

The terminal uses, during measuring, a setting in which the measuring gap can be reduced for the signal set received in BWP, thereby bringing higher bandwidth utilization. Therefore, the frequency domain position of BWP may be considered in the configuration for the frequency domain of the signal set. In addition, considering the configuration for the subcarrier spacing of the signal set, a longer period may bring about advantages for the terminal such as power saving and air interface resource saving. The configuration for subcarrier spacing may satisfy more application scenarios, for example, only 15 KHz is supported for some scenarios where the bandwidth of some frequency band is limited to 5 MHz, whereas 30 KHz is supported for other scenarios. The configuration for the signal set received by the terminal may include at least one of: configuration of the time domain position, configuration of the frequency domain position, configuration of the subcarrier spacing, configuration of the power, configuration of the period, or configuration of the index, for the transmission of the signal set.

All or part of the above parameters may be configured in a UE-specific RRC message or a system information.

In an embodiment, all or part of the above configurations may be configured in SIB11, for example, in MeasIdleConfigSIB-r16 in SIB11, for indicating the terminal measurement at RRC_IDLE or RRC_INACTIVE. In an embodiment, the above configurations may be configured in SIB4, for example, the InterFreqCarrierFreqInfo configuration in SIB4, for supporting measurement related to inter-band cell reselection at RRC_IDLE or RRC_INACTIVE.

In an embodiment, all or part of the above configurations may be applied to the measurement for target cell in cell handover, which, for example, are configured in ReconfigurationWithSync, for indicating the measurement of the signal set for the target cell at NR PScell and PCell handover.

In an embodiment, all or part of the above configurations may be applied to the measurement for radio link failure/beam failure recovery (RLF/BFR), which, for example, are configured in RadioLinkMonitoringRS and/or BeamFailureRecoveryConfig, for indicating the measurement of the signal set for RLF and/or BFR.

The terminal may perform reception of the signal set and/or other processing flows according to the configuration.

Specifically, the detailed description and embodiments in which the terminal receives the configurations are given below, respectively.

Alternatively, the terminal receiving the signal set includes the terminal receiving a SSB or signal set in the same half frame, in which the position of the first symbol of the candidate SSB or signal set is determined by the subcarrier spacing of the SSB or signal set.

Figure 7A:

In this method, the signal set and SSB are frequency division multiplexed, which is beneficial for the system to perform configuration for time slots in time domain more flexibly. In one implementation, according to frequency point of cell, subcarrier spacing, etc. the base station transmits SSB at a corresponding symbol position, and the terminal receives SSB at an appointed position. Take the subcarrier spacing of 30 KHz as an example:

Case B (caseB): the symbol position of the starting point of the signal set is {4, 8, 16, 20}+28*n, as shown in FIG. 7A; and/or Case C (caseC): the symbol position of the starting point of the signal set is {2, 8}+14*n, as shown in FIG. 7B.

When the subcarrier spacing of the signal set is the same as that of the SSB, the symbol position of the candidate signal set is the same as that of the SSB. At this time, the terminal receives the pilot at the time domain symbol position of the SSB. When the subcarrier spacing of the signal set is different from that of the SSB, the symbol position of the candidate signal set is different from that of the SSB. At this time, the terminal receives the signal set at a symbol position determined according to the above rules.

Alternatively, the terminal receiving the signal set includes the terminal receiving the signal set in a half frame different from the SSB, and the position of the first symbol of the candidate SSB or signal set in the half frame is determined by the subcarrier spacing of the SSB or signal set, respectively.

Figure 8:
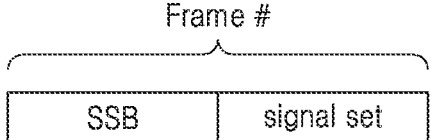
FIG. 8 illustrates a signal set and an SS burst set are configured to be transmitted in different half frames according to an embodiment of the present disclosure.

When the time domain symbol position of the signal set is different from that of the SSB, if the gap between these two satisfies the requirements for gap of radio frequency conversion for terminal, the terminal may support the measurement of both the signal set and the SSB at the same time by configuring the measuring gap, so as to achieve better system performance. According to one embodiment of this method, the signal set may be configured to be transmitted in a half frame different from the SS burst set, as shown in FIG. 8. Since the SSB and the signal set overlaps in time domain when the period is 5 ms, so a restriction may be added: the period cannot be configured to be 5 ms. In addition, a configuration message may also be added for indicating whether the time domain half frame of the configuration for the signal set overlaps with that of the configuration for the current SSB. In the generation of a PBCH DMRS sequence, the parameter of half frame index for the signal set is 1 when the PBCH is transmitted in the first half frame of a frame, and 0 when the PBCH is transmitted in the second half frame of the frame.

In an embodiment, a 1-bit information of halfFrame may be configured in a common information of ServingCellConfigCommon configured by the serving cell, for indicating whether the signal set and the current SSB are transmitted in different time domain half frames. When halfFrame is configured to be true, it indicates that the position of the time domain half frame of the signal set is different from that of the SSB, and the period parameter of the signal set cannot be configured to be 5 ms at this time.

Alternatively, for unpaired spectrum over one carrier, when the symbols of physical uplink shared channel (PUSCH), physical uplink control channel (PUCCH), physical random access channel (PRACH) overlap with the symbols of the configured SSB or signal set, the terminal does not perform such uplink transmission in the time slot where the SSB or signal set is located, and the terminal does not transmit the uplink Sounding Reference Signal (SRS) in the time slot where the SSB or signal set is located.

Alternatively, the terminal receives a frequency domain configuration for signal set.

In the prior art, a cell-defining SSB may be located in the synchronization raster/GSCN position in frequency domain, but for the signal set, it is not necessary to require its frequency domain position to be in the synchronization raster since it is used for downlink synchronization and channel quality measurement. If the configured frequency domain position is the synchronization raster, during the initial random access, when the frequency point is in FR1 and the parameter $k_{SSB}$>23, or when the frequency point is in FR2 and the parameter $k_{SSB}$>11, the terminal does not perform reception of subsequent system information in the SSB signal. Similarly, the frequency domain position of the signal set does not need to be on the synchronization raster. The terminal may perform signal reception of the signal set at the frequency domain position of the network configuration, and the base station configuration may include approaches as follows:

Indication of absolute frequency domain value.

The terminal receives an absolute frequency indication. In an embodiment, the downlink frequency information (FrequencyInfoDL) in the common downlink configuration (DownlinkConfigureCommon) adds a parameter of absoluteFrequencySSB-R17 for indicating the frequency domain position of the signal set. According to the ARFCN value, the terminal calculates the central frequency point of the signal set. This method may directly obtain the frequency domain position without reference to other parameter values as shown in TABLE 8:

TABLE 8

| FrequencyInfoDL ::= | SEQUENCE { |
| --- | --- |
| absoluteFrequencySSB-R17 | ARFCN-ValueNR |
| } | |

Indication of frequency domain relative value;

Relative to the central frequency point of SSB.

At this time, the terminal may indirectly obtain the frequency domain position of the signal set according to the frequency domain position of the SSB configuration, that is, calculate the central frequency point of the signal set according to the configuration parameter of frequencySSBOffset plus the SSB central frequency point:

TABLE 9

| FrequencyInfoDL ::= | SEQUENCE { |
| --- | --- |
| frequencySSBOffset | INTEGER (-maxARFCN..maxARFCN); |

Relative to the starting point of BWP.

At this time, the terminal may indirectly obtain the frequency domain position of the signal set according to the frequency domain starting point position of the BWP configuration, that is, the number of RBs between the first resource block (RB) occupied by the signal set and the first RB of the bandwidth BWP is configured by parameters, where RB is defined by a FR1 subcarrier spacing of 15 KHz or a FR2 subcarrier spacing of 60 KHz. In an embodiment, OffsetToBWP is configured in radioLinkMonitoRS or BWP or BeamFailureRecoveryConfig. This method may make the parameters occupy less number of information bits, compared to the first two methods. In addition, the terminal may obtain the number of subcarriers of a gap between the subcarrier with the smallest index of the RB with the smallest index overlapping the signal set and the subcarrier with the smallest index occupied by the signal set according to the indication message of ssb-SubcarrierOffset-R17:

Relative to the starting point of PointA.

According to the configuration of offsetToPointA, the terminal obtains the number of RBs from pointA to the subcarrier with the smallest index in the RB with the smallest index overlapping the signal set, where RB is defined by a FR1 subcarrier spacing of 15 KHz or a FR2 subcarrier spacing of 60 KHz. In addition, the terminal may obtain the number of subcarriers of a gap between the subcarrier with the smallest index of the RB with the smallest index overlapping with the signal set and the subcarrier with the smallest index occupied by the signal set according to the indication message of ssb-SubcarrierOffset-R17. This method is independent of BWP configuration and has better universality.

In an embodiment, the above indications are used to determine the frequency domain position of the signal set for measurement of the serving cell and/or the neighboring cell, and the related configuration for the signal set for measurement of the serving cell and/or the neighboring cell is based on this frequency domain position. When this parameter is not configured, related configurations for signal set may not be configured, such as the position, period and subcarrier spacing of the signal set in the time domain burst.

Figure 9:
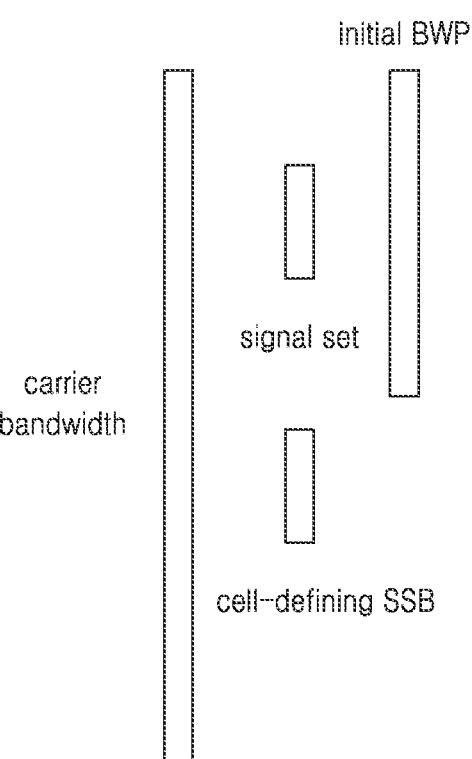
FIG. 9 illustrates a signal set that is located within an initial BWP according to an embodiment of the present disclosure.

In order to guarantee that during measuring in a RRC IDLE or INACTIVE state, the terminal is not required to perform radio frequency shifting during synchronization measurement of the signal set and demodulation of the paging control channel and data channel, it may be satisfied that the signal set and the paging data channel are within the initial BWP (as shown in FIG. 9) or their configured paging CORESET band. In an embodiment, a RBoffset value from CORSET0 to SSB is used.

For example, TABLE 10 shows a scenario with a subcarrier spacing of 15 KHz for signal set and a subcarrier spacing of 15 KHz for physical downlink control channel (PDCCH), and the offset (in the unit of RB) being defined as a gap between the minimum RB number of a Type2-PDCCH CSS set and the first minimum RB of a signal set that coincides with a common RB. At this time, the frequency domain configuration for the paging CORESET may be jointly determined based on the frequency domain position of the signal set and the Offset (in the unit of RB) value in TABLE 10.

TABLE 10

| Signal set and offset | | | | |
| --- | --- | --- | --- | --- |
| Index | SS/PBCH block and CORESET multiplexing pattern | Number of RBs $N_{RB}^{CORESET}$ | Number of Symbols $N_{symb}^{CORESET}$ | Offset (RBs) |
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |

TABLE 10-continued

| | | Signal set and offset | | |
|---|---|---|---|---|
| Index | SS/PBCH block and CORESET multiplexing pattern | Number of RBs $N_{RB}^{CORESET}$ | Number of Symbols $N_{symb}^{CORESET}$ | Offset (RBs) |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | Reserved | | |

Alternatively, the terminal receives a configuration of subcarrier spacing for signal set.

In an embodiment, the subcarrier spacing of the signal set received by the terminal is configured by the parameter of ssbSubcarrierSpacing-R17 in ServingCellConfigCommon:

The subcarrier spacing of the signal set is configured to be different from that of the SSB or BWP.

The subcarrier spacing of the signal set is different from that of the SSB, which may bring about more flexibility to network configuration. When the subcarrier spacing of the signal set is different from that of the BWP it is located, it is required to reserve sideband resources during scheduling so as to reduce the interference of adjacent subcarriers, because there is a certain waste of resources:

The subcarrier spacing of the signal set is configured to be the same as that of the SSB or BWP.

The subcarrier spacing of the signal set received by the terminal may be the same as that of the SSB as default, and thus no explicit configuration is required at this time. At this time, when the terminal performs measurements, since both of them occupy the same number of RBs, their measurement results are similar, and operations such as combining may be performed. By default, in this case, it is not required to reserve sidebands, and thus it is beneficial for bandwidth utilization.

Alternatively, when the terminal receives a physical downlink shared channel (PDSCH) scrambled with a system information radio network temporary identity (SI-RNTI) (the system information is indicated as 1) or a RA-RNTI/MSGB-RNTI/P-RNTI/TC-RNTI/C-RNTI/CS-RNTI, if the resource blocks (RBs) for this PDSCH transmission overlaps with the resource blocks for the transmission indicated in the frequency domain configuration for SSB/signal set, the terminal does not expect that the RBs overlapping in terms of symbols (i.e., RBs containing the SSB or signal set in terms of symbols) are not used for PDSCH transmission by default.

In an alternative embodiment, the configuration for subcarrier spacing or power or period or indexing of signal sets respectively uses a corresponding configuration for SSB.

Alternatively, the terminal receives a configuration for power of the signal set.

The terminal may assume that the power of the signal set is the same as the transmission power of the SSB. At this time, no explicit indication is needed, which is beneficial for saving air interface resources. The terminal may also obtain the power of the signal set by configuration, so that the configuration for signal set is more flexible and suitable for more scenarios:

The configuration includes an absolute value of power of signal set.

In an embodiment, the terminal receives ss-PBCH-Block-Power-R17 configured in ServingCellConfigCommon, which indicates the absolute value of power of signal set.

The configuration includes a value of power of signal set relative to SSB.

In an embodiment, the terminal receives ss-PBCH-Block-PowerOffset-R17 configured in ServingCellConfigCommon, which indicates a difference of the signal set from SS-PBCH-Blockpower. At this time, the number of bits required for configuration is less than that for the absolute value of power, thus contributing to better system performance.

Alternatively, the terminal receives a configuration for period of signal set.

The terminal may assume that the period of the signal set is the same as that of the SSB, and at this time, no explicit indication is needed, which is beneficial for saving air interface resources. The terminal may also obtain the period of the signal set by configuration, so that the configuration for signal set is more flexible and suitable for more scenarios. In an embodiment, the terminal receives ssb-periodicityServingCell-R17 configured in ServingCellConfigCommon, which indicates the period of the signal set.

Alternatively, the terminal receives a configuration for transmission index of signal set.

The terminal may assume that the transmission index of the signal set is the same as that of the SSB, and at this time no explicit indication is needed, thus saving signaling.

The terminal may also obtain the transmission index of the signal set by configuration, so that the configuration for signal set is more flexible and suitable for more scenarios.

In an embodiment, the terminal receives ssb-PositionsIn-Burst-R17 configured in ServingCellConfigCommon. If the transmission index of the signal set is the same as that of the SSB, this same index indicates that the signal set and the SSB have the same Doppler frequency shift, average time delay and/or spatial reception radio frequency (RF) parameters.

After receiving all or part of the above configurations for signal set, the terminal may store the configurations. In an embodiment, after obtaining related configurations from RRC reconfiguration/RRC recovery/SIB4/SIB11, the terminal stores the configurations for reception and measurement of subsequent signal sets. In an embodiment, the terminal may determine a transmission indication of other pilot signals according to the received configuration for signal set, and then receive the pilot signals based on the acquired configuration for a first signal and the transmission indication of the other pilot signals. The other pilot signals may be referred to as the first signal, and in various embodiments, the other pilot signals include at least one of: synchronization signal/physical broadcast channel block (SSB), channel state information reference signal (CSI-RS), tracking reference signal TRS, sounding reference signal (SRS), or demodulation reference signal (DMRS).

In another embodiment, after receiving related configurations for signal set, the terminal may further perform measurement of signal quality, trigger a selection of random access type according to the measurement result, and/or trigger a random access process; an RLF/BFR/RRM measurement may also be performed, and a subsequent mechanism may be performed according to the measurement result.

Specifically, the descriptions and embodiments of the detailed operation of the terminal after receiving the signal set are given below.

Alternatively, the signal set may be used as a signal source of the transmission configuration indicator, that is, it may be signal set uses a more appropriate threshold for random access, thus improving success rate for access. In addition, the threshold may also be indicated by a relative value so as to reduce signaling overhead. In an embodiment, rsrp-ThresholdSSBOffset-R17 is configured, which is a RSRP offset relative to the parameter of rsrp-ThresholdSSB.

TABLE 11

| |
|---|
| RACH-ConfigCommon ::=         SEQUENCE { |
| ssb-perRACH-OccasionAndCB-PreamblesPerSSB-R17 CHOICE { |
| oneEighth                                           ENUMERATED |
| {n4,n8,n12,n16,n20,n24,n28,n32,n36,n40,n44,n48,n52,n56,n60,n64}, |
| oneFourth                                          ENUMERATED |
| {n4,n8,n12,n16,n20,n24,n28,n32,n36,n40,n44,n48,n52,n56,n60,n64}, |
| oneHalf                                             ENUMERATED |
| {n4,n8,n12,n16,n20,n24,n28,n32,n36,n40,n44,n48,n52,n56,n60,n64}, |
| one                                                ENUMERATED |
| {n4,n8,n12,n16,n20,n24,n28,n32,n36,n40,n44,n48,n52,n56,n60,1164}, |
| two                          ENUMERATED {n4,n8,n12,n16,n20,n24,n28,n32}, |
| four                       INTEGER (1..16), |
| eight                      INTEGER (1..8), |
| sixteen                   INTEGER (1..4) |
| }                            OPTIONAL, -- Need M |
| rsrp-ThresholdSSB-R17          RSRP-Range        OPTIONAL, -- Need R | configured to be quasi-co-located with other pilot signals, i.e., as a quasi-co-location type of other pilot signals:

For periodic Channel State Information-Reference Signal (CSI-RS) resources configured with trs-Info, the SSB or signal set with a quasi-co-location type of typeC/typeD may be configured;

For CSI-RS resources without configured trs-Info and repetition, the SSB or signal set with a quasi-co-location type indicated as typeD may be configured; and/or For CSI-RS resources configured with repetition, the SSB or signal set with a quasi-co-location type of typeC/typeD may be configured, where typeC: {Doppler frequency shift and average time delay}, and typeD: {spatial receiving RF parameters}.

Alternatively, the terminal receives a configuration for mapping relationship between random access channel occasions (RACH Occasion, referred to as RO for short) and signal sets.

Alternatively, the terminal selects a mapping relationship to use according to its capability.

In an embodiment, the terminal assumes that the signal set and the SSB use the same mapping relationship between ROs and signal sets by default, and at this time no explicit indication is needed, thus saving signaling. The terminal may also obtain the mapping relationship between ROs of signal sets and signal sets by configuration, which may improve flexibility for network configuration.

In an embodiment, a random access related parameter based on signal sets is configured in RACH configuration common information (RACH-ConfigCommon): ssb-per-RACH-OccasionAndCB-PreamblesPerSSB-R17, which indicates the number of signal sets corresponding to each RACH transmission occasion.

For a low-capability terminal, it may perform random access according to the above mapping relationship between ROs and signal sets. At this time, the terminal performs random access using resources corresponding to a signal set with a measured reference signal received power (RSRP) satisfying rsrp-ThresholdSSB-R17 threshold. In an embodiment, a random access related parameter based on signal set is configured in RACH-ConfigCommon: rsrp-Threshold-SSB-R17, which indicates the RSRP threshold, so that the Similarly, for random access type2, msgA-SSB-per-RACH-OccasionAndCB-PreamblesPerSSB-R17 is configured, which is used to indicate the number of signal sets corresponding to each RACH occasion. The low-capability terminal uses resources corresponding to a signal set with a RSRP satisfying the msgA-RSRP-ThresholdSSB-R17 threshold for random access.

Alternatively, the terminal uses different thresholds for selecting types of random access (RA) according to its capability.

For a low-capability terminal, the number of receiving antennas decreases, leading to a reduction in the energy of the downlink measurement signal, while the number of uplink transmitting antennas does not decrease, in which case if determination of type of random access still uses the original parameters, it will be made relatively difficult to trigger a two-step random access for such terminals.

Therefore, for a low-capability terminal, when a four-step and a two-step RA type of random accesses are both configured in uplink BWP, the terminal selects the four-step or two-step RA type according to the RSRP threshold value given by the parameter of msgA-RSRP-Threshold-r17, or the low-capability terminal selects the four-step or two-step RA type according to the RSRP threshold offset value given by msgA-RSRP-ThresholdOffset plus the threshold of msgA-RSRP-Threshold, as a final threshold. This method contributes to selecting a better type of random access, thus improving system performance.

Alternatively, the terminal selects a processing bandwidth for random access/Paging reception according to a capability determination.

For a low-capability terminal, it may use a frequency domain bandwidth occupied by RA/paging configured CORESET as the processing bandwidth during random access/paging reception. At this time, the data indicated by the PDCCH scrambled with random access radio network temporary identifier/temporary cell radio network temporary identifier/paging radio network temporary identifier (RA-RNTI/TC-RNTI/P-RNTI) may be within this CORESET bandwidth. This method can reduce the number of bits occupied by PDCCH indication and save air interface resources. In an embodiment, for a DCI scrambled in an above manner in DCI format1_0, the parameter of $$N_{RB}^{DL,BWP}$$

in the frequency domain resource indication bit $$\lceil \log_2(N_{RB}^{DL,BWP}(N_{RB}^{DL,BWP} + 1)/2) \rceil$$

is CORESET0 or a RA/paging configured CORESET.

Alternatively, the terminal receives a configuration for radio link failure/beam failure recovery (RLF/BFR) measurement based on signal set, and performs a corresponding measurement.

The signal set/SSB in RLM measurement based on signal set/SSB is the signal set/SSB coupled with the initial downlink BWP or a separate initial downlink BWP. The RLM may be configured only in the initial downlink BWP or the separate initial BWP, or in other BWPs containing the coupled signal set/SSB. The signal set/SSB in BFR measurement based on signal set/SSB is the signal set/SSB coupled with the initial downlink BWP or a separate initial downlink BWP. The BFR may be configured only in the initial downlink BWP or the separate initial downlink BWP, or in other BWPs containing the coupled signal set/SSB.

In an embodiment, a configuration for indexing of signal set for RLF and BFD is added, so that the terminal can still perform a corresponding measurement even if CD-SSB is not contained in the BWP, thus improving system performance. Since these two configurations for measurement are dedicated configurations based on BWP, for a redcap UE, only the measurement index may be introduced to indicate that the measurement is based on the index of signal set. The ssb-Index-R17 below is the signal set index introduced in RadioLinkMonitroingRS in this method.

TABLE 12

| RadioLinkMonitoringRS ::= | SEQUENCE { |
|---|---|
| radioLinkMonitoringRS-Id | RadioLinkMonitoringRS-Id, |
| purpose | ENUMERATED {beamFailure, rlf, both}, |
| detectionResource | CHOICE { |
| ssb-Index | SSB-Index, |
| csi-RS-Index | NZP-CSI-RS-ResourceId, |
| ssb-Index-R17 | SSB-Index |

Alternatively, an indication bit of ssb-R17 may be added, for determining whether the ssb-index indication in the current configuration is a signal set index. When ssb-R17 is true, the ssb-index indication in the current configuration is a signal set index introduced in the method according to the present disclosure, otherwise it is a SSB index. A specific implementation is as follows.

TABLE 13

| RadioLinkMonitoringRS ::= | SEQUENCE { |
|---|---|
| radioLinkMonitoringRS-Id | RadioLinkMonitoringRS-Id, |
| purpose | ENUMERATED {beamFailure, rlf both}, |
| ssb-R17 | BOOLEAN |
| detectionResource | CHOICE { |
| ssb-Index | SSB-Index, |
| csi-RS-Index | NZP-CSI-RS-ResourceId, |

Similarly, a parameter of ssb-R17 may be added to BeamFailureRecoveryConfig, for indicating whether the ssb in the parameter of PRACH-ResourceDedicatedBFR is a signal set introduced according to the method of the present disclosure or an SSB. A specific implementation is as follows.

TABLE 14

| BeamFailureRecoveryConfig ::= | SEQUENCE { |
|---|---|
| ssb-R17 | BOOLEAN |
| } | |
| PRACH-ResourceDedicatedBFR ::= | CHOICE { |
| ssb | BFR-SSB-Resource, |
| csi-RS | BFR-CSIRS-Resource |

Alternatively, the terminal receives a configuration for RRM measurement based on signal set, and performs RRM measurement.

The terminal supports the measurement of the serving cell and/or the neighboring cell by using the signal set as the serving cell measurement signal and/or the neighboring cell measurement signal.

For RRM serving cell measurement: the initial BWP does not contain a scenario of cell-defining SSB, and a signal set is configured in the initial BWP, so as to avoid radio frequency shifting for the terminal and reduce power consumption. At this time, the terminal may report the measurement based on the measurement results of the signal set.

In an embodiment, the parameter of servingCellMO in the serving cell configuration (ServingCellConfig) is the measurement configuration with a measurement index of measObjectId configured by the serving cell in measObjectNR. At this time, the measObjectNR and the frequencyInfoDL in the ServingCellConfigCommon configuration may satisfy that the values of ssbFrequency and absoluteFrequencySSB/absoluteFrequencySSB-R17 are the same.

TABLE 15

| ServingCellConfig ::= | SEQUENCE { | |
|---|---|---|
| servingCellMO | MeasObjectId | OPTIONAL, -- Cond |
| MeasObject | | |
| ..., | | |

Figure 10:
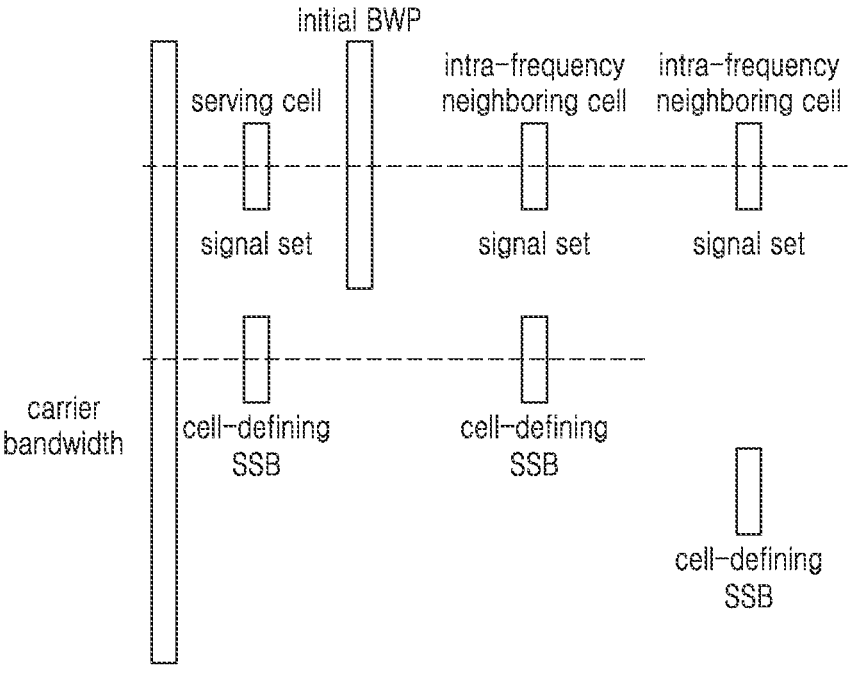
FIG. 10 illustrates adding a signal set in RRM measurement according to an embodiment of the present disclosure.

For RRM neighboring cell measurement: the following definition is added, that is, intra-frequency measurement is defined such that the central frequency of the SSB (or signal set) of the serving cell is the same as that of the SSB (or signal set) of the neighboring cell, and the subcarrier spacings of both are the same. And inter-frequency measurement is defined such that the central frequency of the SSB (or signal set) of the serving cell is different from that of the SSB (or signal set) of the neighboring cell, or the subcarrier spacings of both are different. At present, the intra-frequency or inter-frequency measurement is determined only based on SSB, but the signal set is added in this disclosure, so that the original configuration for inter-frequency measurement may apply to intra-frequency measurement in this method, thus reducing requirements for measuring gap and increasing spectral efficiency, as shown in FIG. 10.

Alternatively, when the terminal performs measurement of one cell, the terminal may perform measurement of one of cell-defining SSB and signal set belonging to this cell, that is, both of them cannot be used as signals for measurement of the serving cell measurement or signals for measurement of the same neighboring cell at the same time. In an embodiment, when the signal set is configured as the measurement signal, the terminal defaults that the cell-defining SSB is no longer used as the measurement signal. The terminal considers that different signal sets are for different cells.

Figure 11:
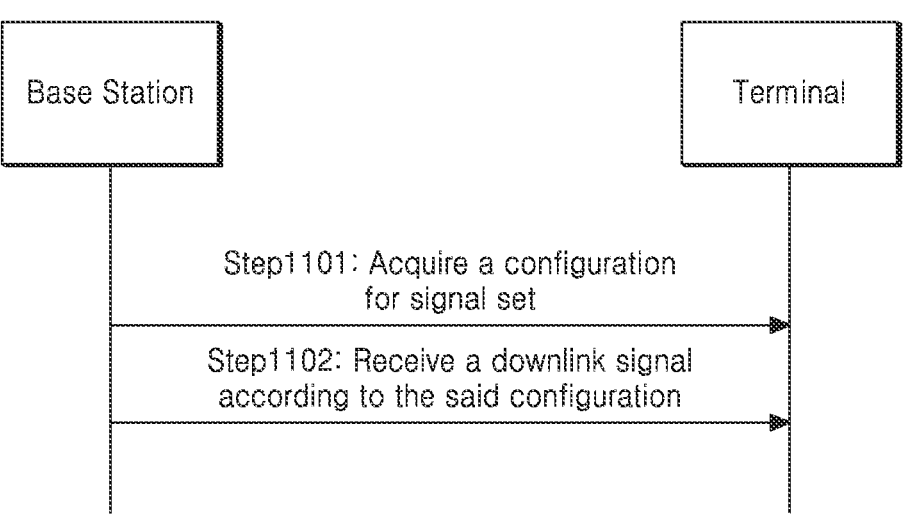
FIG. 11 illustrates a method according to an embodiment of the present disclosure.

FIG. 11 illustrates a method performed by a terminal according to an embodiment of the present disclosure. Specifically, in step 1101, a configuration for signal set is acquired; and in step 1102, a downlink signal is received according to the acquired configuration for signal set.

In a further embodiment, receiving a downlink signal according to the acquired configuration for signal set may include: receiving a signal set based on the acquired configuration for signal set; and/or acquiring a transmission indication of a first signal based on the acquired configuration for signal set and the configuration for the first signal, and receiving the first signal based on the configuration for the first signal and the acquired transmission indication of the first signal. In a further embodiment, the first signal includes at least one of: a synchronization signal/physical broadcast channel block (SSB), a channel state information reference signal (CSI-RS), a tracking reference signal TRS, a sounding reference signal (SRS), or a demodulation reference signal (DMRS).

In various embodiments, the signal set is one of: synchronization signal/physical broadcast channel block SS/PBCH block (SSB); a combination of primary synchronization signal, secondary synchronization signal and physical broadcast channel demodulation reference signal (PBCH DMRS); a combination of primary synchronization signal and secondary synchronization signal; a combination of the secondary synchronization signal and PBCH DMRS; or a secondary synchronization signal.

In various embodiments, the configuration may include a configuration for at least one of the following items of the signal set: time domain position, frequency domain position, subcarrier spacing, power, period, indexing, mapping relationship between random access occasions and signal sets, and random access (RA) type selection threshold.

An aspect of the present disclosure further provides a terminal, which includes: a transceiver; and a processor configured to control the transceiver to perform the above method.

An aspect of the present disclosure further provides a method performed by a base station, which includes: transmitting a configuration for signal set; transmitting a downlink signal according to the said configuration.

Another aspect of the present disclosure further provides a base station, which includes: a transceiver; and a processor configured to control the transceiver to perform the above method corresponding to the terminal.

Although one or more embodiments have been described with reference to the accompanying drawings, it will be understood by those skilled in the art that various changes in forms and details can be made without departing from the spirit and scope defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user equipment (UE) in a wireless communication system, the method comprising:

receiving, from a base station (BS), first configuration information associated with at least one non-cell defining-synchronization signal block (NCD-SSB) and second configuration information associated with measObjectNR;

identifying, based on the first configuration information, configurations associated with the at least one NCD-SSB, wherein the configurations associated with the at least one NCD-SSB includes configuration for frequency domain, configuration for period, and configuration for time domain for the at least one NCD-SSB; and receiving the at least one NCD-SSB based on the identified configurations, wherein, in case that a ssbFrequency parameter for CD-SSB is configured in the measObjectNR, a value of the ssbFrequency parameter is the same as a value of the configuration for the frequency domain included in the configurations associated with the at least one NCD-SSB.

2. The method of claim 1, wherein the first configuration information associated with the at least one NCD-SSB is indicated based on a UE-specific radio resource control (RRC) message for the UE.

3. The method of claim 1, wherein:

a SSB configured in quasi-co-location (QCL) information refers to the at least one NCD-SSB; or a SSB configured in radio link monitoring (RLM) reference signal (RS) information refers to the at least one NCD-SSB.

4. The method of claim 1, wherein:

the configuration of time domain indicates a time offset between a cell defining-synchronization signal block (CD-SSB) and the at least one NCD-SSB;

a value of the time offset is set to 5 ms; and the at least one NCD-SSB is transmitted 5 ms later than the CD-SSB transmitted.

5. The method of claim 1, wherein a transmission index, a cell identifier (ID) and a transmission power of the at least one NCD-SSB are the same as a transmission index, a cell ID, and a transmission power of at least one CD-SSB.

6. The method of claim 1, wherein, in case that an uplink transmission overlaps with a set of symbols of a slot configured for a reception of the at least one NCD-SSB, the UE does not perform the uplink transmission in the slot.

7. The method of claim 1, wherein a CD-SSB and the at least one NCD-SSB have same time domain location.

8. A method of a base station (BS) in a wireless communication system, the method comprising:

transmitting, to a user equipment (UE), first configuration information associated with at least one non-cell defining-synchronization signal block (NCD-SSB) and second configuration information associated with measObjectNR; and transmitting, to the UE, the at least one NCD-SSB based on information indicating configurations associated with the at least one NCD-SSB included in the first configuration information, wherein the information indicating the configurations associated with the at least one NCD-SSB includes information indicating configuration for frequency domain, information indicating configuration for period, and information indicating configuration for time domain for the at least one NCD-SSB, and wherein, in case that a ssbFrequency parameter for CD-SSB is configured in the measObjectNR, a value of the ssbFrequency parameter is the same as a value of the configuration of the frequency domain included in the configurations associated with the at least one NCD-SSB.

9. The method of claim 8, wherein the first configuration information associated with the at least one NCD-SSB is indicated based on a UE-specific radio resource control (RRC) message for the UE.

10. The method of claim 8, wherein:

the configuration of time domain indicates a time offset between a cell defining-synchronization signal block (CD-SSB) and the at least one NCD-SSB;

a value of the time offset is set to 5 ms; and the at least one NCD-SSB is transmitted 5 ms later than the CD-SSB transmitted.

11. The method of claim 8, wherein a transmission index, a cell identifier (ID), and a transmission power of the at least one NCD-SSB are the same as a transmission index, a cell ID, and a transmission power of at least one CD-SSB.

12. A user equipment (UE) in a wireless communication system, the UE comprising:

a transceiver;

at least one processor operably connected to the transceiver; and at least one memory, communicatively coupled to the at least one processor, storing instructions executable by the at least one processor individually or in any combination to cause the UE to:

receive, from a base station (BS), first configuration information associated with at least one non-cell defining-synchronization signal block (NCD-SSB) and second configuration information associated with measObjectNR, identify, based on the first configuration information, configurations associated with the at least one NCD-SSB, wherein the configurations associated with the at least one NCD-SSB includes configuration for frequency domain, configuration for period and configuration for time domain for the at least one NCD-SSB, and receive the at least one NCD-SSB based on the identified configurations, wherein, in case that a ssbFrequency parameter for CD-SSB is configured in the measObjectNR, a value of the ssbFrequency parameter is the same as a value of the configuration of the frequency domain included in the configurations associated with the at least one NCD-SSB.

13. The UE of claim 12, wherein the first configuration information associated with the at least one NCD-SSB is indicated based on a UE-specific radio resource control (RRC) message for the UE.

14. The UE of claim 12, wherein:

a SSB configured in quasi-co-location (QCL) information refers to the at least one NCD-SSB; or a SSB configured in radio link monitoring (RLM) reference signal (RS) information refers to the at least one NCD-SSB.

15. The UE of claim 12, wherein:

the configuration of time domain indicates a time offset between a cell defining-synchronization signal block (CD-SSB) and the at least one NCD-SSB;

a value of the time offset is set to 5 ms; and the at least one NCD-SSB is transmitted 5 ms later than the CD-SSB transmitted.

16. The UE of claim 12, wherein a transmission index, a cell identifier (ID), and a transmission power of the at least one NCD-SSB are the same as a transmission index, a cell ID, and a transmission power of at least one CD-SSB.

17. A base station (BS) in a wireless communication system, the BS comprising:

a transceiver;

at least one processor operably connected to the transceiver; and at least one memory, communicatively coupled to the at least one processor, storing instructions executable by the at least one processor individually or in any combination to cause the BS to:

transmit, to a user equipment (UE), first configuration information associated with a non-cell defining-synchronization signal block (NCD-SSB) and second configuration information associated with measObjectNR, and transmit, to the UE, the at least one NCD-SSB based on information indicating configurations associated with the at least one NCD-SSB included in the first configuration information, wherein the information indicating the configurations associated with the at least one NCD-SSB includes information indicating configuration for frequency domain, information indicating configuration for period and information indicating configuration for time domain for the at least one NCD-SSB, and wherein, in case that a ssbFrequency parameter for CD-SSB is configured in the measObjectNR, a value of the ssbFrequency parameter is the same as a value of the configuration of the frequency domain included in the configurations associated with the at least one NCD-SSB.

18. The BS of claim 17, wherein the first configuration information associated with the at least one NCD-SSB is indicated based on a UE-specific radio resource control (RRC) message for the UE.

19. The BS of claim 17, wherein:

the configuration of time domain indicates a time offset between a cell defining-synchronization signal block (CD-SSB) and the at least one NCD-SSB; and a value of the time offset is set to 5 ms; and the at least one NCD-SSB is transmitted 5 ms later than the CD-SSB transmitted.

20. The BS of claim 17, wherein a transmission index, a cell identifier (ID), and a transmission power of the at least one NCD-SSB are the same as a transmission index, a cell ID and a transmission power of at least one CD-SSB.

* * * * *